May 15, 1956     G. M. HOLLEY, SR     2,745,394
MANIFOLD ASSEMBLY FOR INTERNAL COMBUSTION ENGINES
Filed June 28, 1954
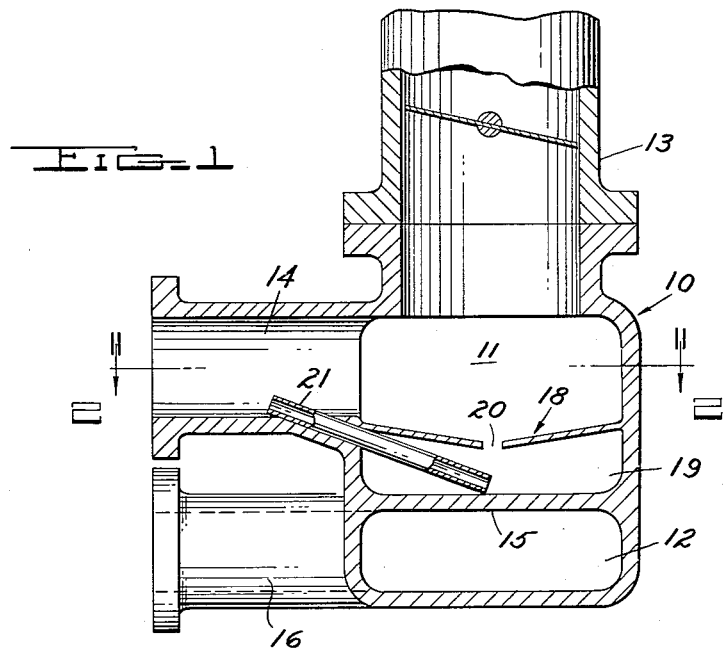
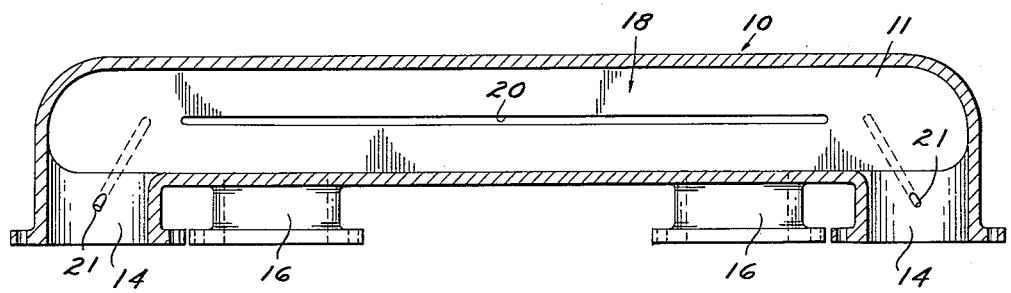
INVENTOR.
GEORGE M. HOLLEY SR
BY
*ATTORNEYS*

United States Patent Office 2,745,394
Patented May 15, 1956

2,745,394

MANIFOLD ASSEMBLY FOR INTERNAL COMBUSTION ENGINES

George M. Holley, Sr., Grosse Pointe, Mich., assignor to Holley Carburetor Company, Detroit, Mich., a corporation of Michigan Application June 28, 1954, Serial No. 439,766

6 Claims. (Cl. 123—122)

This invention relates to a manifold assembly for internal combustion engines.

It is an object of this invention to improve the fuel induction system of an internal combustion engine by providing a manifold assembly having an intake manifold embodying means for trapping unvaporized fuel prior to the introduction of such fuel into the engine and having an exhaust manifold arranged to heat the trapped unvaporized fuel to the vaporizing temperature.

It is another object of this invention to provide means for conducting the fuel vaporized within the intake manifold by the heat of the exhaust gases to the stream of vaporized fuel mixture flowing through the intake manifold to the engine.

The foregoing as well as other objects will be made more apparent as the description proceeds especially when considered in connection with the accompanying drawing, wherein:

Figure 1 is a semi-diagrammatic sectional view through a manifold assembly embodying the feature of this invention; and Figure 2 is a sectional view taken on the line 2—2 of Figure 1.

In the drawing, the numeral 10 indicates a manifold assembly attachable in any suitable manner to an internal combustion engine, not shown. The assembly 10 comprises an intake manifold 11 and an exhaust manifold 12. The intake manifold 11 has a mixing tube 13 intermediate the ends thereof for conducting fuel mixture into the intake manifold and has outlet ports 14 located to discharge the fuel mixture into the combustion chambers of the engine.

In the present instance, the exhaust manifold 12 is formed integral with the intake manifold 11 and is arranged beneath the intake manifold in a manner such that the bottom wall 15 of the intake manifold also forms the top wall of the exhaust manifold. In any case the exhaust manifold 12 is located in heat exchange relationship to the intake manifold and is formed with ports 16 for receiving the products of combustion from the engine. In accordance with conventional practice, the exhaust manifold also has a discharge passage (not shown) for connection to the usual exhaust pipe or muffler, not shown.

In the operation of internal combustion engines unvaporized portions of the fuel are frequently carried by the vaporized fuel mixture into the engine and this raw fuel interferes with the operation of the engine. The unvaporized portions of the fuel are usually heavier than the vaporized particles of the fuel mixture and have a tendency to drop out of the charge flowing through the intake manifold to the engine. In accordance with this invention the portions of unvaporized fuel which drop out of the stream of fuel mixture passing through the intake manifold 11 are deposited on a wall 18 extending lengthwise of the intake manifold 11 below the outlet ports 14 and forming with the bottom wall 15 of the intake manifold a chamber 19.

As shown in Figure 1 of the drawing, the wall 18 is substantially V-shaped in cross section and has an elongated slot 20 at the center to permit fuel deposited on the wall to flow into the chamber 19. Inasmuch as the chamber 19 is in heat transfer relationship to the exhaust manifold 12, the fuel accumulated within the chamber 19 is heated by the exhaust gases flowing through the manifold 12 and is vaporized. The fuel vaporized within the chamber 19 is conducted to the charge or stream of fuel mixture passing into the engine from the intake manifold 11 by conduits 21. The conduits 21 extend upwardly from opposite ends of the chamber 19 into the respective outlet ports 14 so that the flow of fuel mixture through the ports 14 past the outlet ends of the conduits 21 creates a suction which assists in drawing the vaporized fuel from the chamber 19 to the outlet ports 14. In addition, fuel vaporized within the chamber 19 may flow upwardly through the slot 20 into the stream of fuel mixture flowing through the intake manifold. Thus, the manifold assembly reduces the quantity of unvaporized fuel admitted to the engine and hence improves the efficiency of the latter.

What I claim as my invention is:

1. A manifold assembly for internal combustion engines, comprising an intake manifold having a bottom wall, an intake port through which fuel mixture is conducted into the manifold, outlet ports through which fuel mixture is discharged into an engine and spaced above the bottom wall, means for collecting unvaporized fuel dropping from the fuel mixture flowing from the intake port to the outlet ports, said means comprising a supplemental wall extending below the outlet ports in spaced relationship to the bottom wall of the intake manifold to provide a chamber and having an opening through which unvaporized fuel passes into the chamber, means for heating the unvaporized fuel accumulated within the chamber to a temperature sufficiently high to vaporize the fuel, passages connecting the chamber to the outlet ports for conveying the fuel vaporized in said chamber to the outlet ports, the supplemental wall extending for the full length of the bottom wall of the intake manifold, said passages comprising tubes having their inner ends communicating with the chamber and having their outer ends respectively communicating with the outlet ports.

2. The structure defined in claim 1 wherein the supplemental wall has a slot extending lengthwise of the manifold intermediate the opposite side edges and wherein the portions of the supplemental wall at opposite sides of the slot are inclined downwardly toward the bottom wall of the manifold.

3. The structure defined in claim 2 wherein the means for heating the unvaporized fuel in said chamber comprises a manifold for the exhaust gases arranged in heat conducting relationship to the bottom wall of the intake manifold.

4. A manifold assembly for an internal combustion engine comprising an elongated intake manifold having an intake port intermediate its ends and outlet ports adjacent its ends, an elongated exhaust manifold beneath said intake manifold, said manifolds having a common wall forming the bottom wall of said intake manifold and the top wall of said exhaust manifold, a partition extending the full length of said intake manifold below said outlet ports, said partition having an elongated slot extending longitudinally of said intake manifold, said partition having a smooth unobstructed upper surface to provide a minimum of interference with the flow of fuel mixture, the portions of said partition at opposite sides of said slot being inclined downwardly toward said slot, said partition and said common wall defining a vaporizing chamber for vaporizing unvaporized fuel passing through said slot.

5. A manifold assembly for an internal combustion engine comprising an elongated intake manifold having an intake port intermediate its ends and outlet ports adjacent its ends, an elongated exhaust manifold beneath said intake manifold, said manifolds having a common wall forming the bottom wall of said intake manifold and the top wall of said exhaust manifold, a partition extending the full length of said intake manifold below said outlet ports, said partition having an elongated slot extending longitudinally of said intake manifold, said partition having a smooth unobstructed upper surface to provide a minimum of interference with the flow of fuel mixture, the portions of said partition at opposite sides of said slot being inclined downwardly toward said slot, said partition and said common wall defining a vaporizing chamber for vaporizing unvaporized fuel passing through said slot, and passages extending from said chamber directly into said outlet ports.

6. A manifold assembly for an internal combustion engine comprising an elongated intake manifold having an intake port intermediate its ends and outlet ports adjacent its ends, said manifold having a bottom wall, a partition extending the full length of said intake manifold below said outlet ports, said partition having an elongated slot extending longitudinally of said intake manifold, said partition having a smooth unobstructed upper surface to provide a minimum of interference with the flow of fuel mixture, the portions of said partition at opposite sides of said slot being inclined downwardly toward said slot, and means for heating the bottom wall of said manifold to vaporize the unvaporized fuel passing through said slot.

References Cited in the file of this patent
UNITED STATES PATENTS 1,706,845    Eynon _____ Mar. 26, 1929